March 5, 1963 H. R. DALTON 3,079,859

ELECTRO-RESPONSIVE PLANOGRAPHIC PLATE
AND METHODS OF MANUFACTURE
Filed Nov. 28, 1955

HAROLD R. DALTON
INVENTOR.

BY John J. Rogan
ATTORNEY

United States Patent Office 3,079,859

Patented Mar. 5, 1963

3,079,859

ELECTRO-RESPONSIVE PLANOGRAPHIC PLATE AND METHODS OF MANUFACTURE

Harold R. Dalton, Jenkintown, Pa., assignor to Timefax Corporation, New York, N.Y., a corporation of New York Filed Nov. 28, 1955, Ser. No. 549,373
9 Claims. (Cl. 101—149.2)

This invention relates to planographic printing plates of the metal kind, and more especially it relates to methods of manufacturing such plates.

A principal object of the invention is to provide a metal plate which is specially prepared to render it electroresponsive by electrochemical action in selected areas when acted upon by voltages applied to those areas, so as to produce a planographic printing plate wherein the said selected areas are rendered selectively receptive to take up ink from the inking device of any well known planographic, offset, or lithographic printing machine.

Another object is to provide methods of manufacturing an electro-responsive metal planographic printing plate which will selectively respond to electric currents, such for example as facsimile signals, to produce a permanent record of the signals on the surface of the plate by electrochemical action thereon, and so that the plate with its record can later be used as a planographic master to make copies by the well known offset or lithographic process.

A feature of the invention relates to a metal plate having a specially prepared surface coat which constitutes an electrolyte for voltages applied to the coat at selected areas, and wherein the metal plate forms the electrolytic anode resulting in the deposition of a raised record on the metal surface, which record is selectively ink receptive when used in any well known offset or lithographic printing machine.

Another feature relates to a planographic printing blank comprising a metal sheet having removably attached to one face thereof a coat which contains a specially prepared electrolyte for responding electrolytically to applied electric voltages so as to react with the plate to form thereon raised areas which are ink receptive while the remainder of the plate is non-ink receptive.

A further feature relates to the successive steps which constitute a novel method of making metal plate planographic printing masters.

Other features and advantages not particularly enumerated will be apparent after a consideration of the following detailed descriptions and the appended claims.

Figure 1:
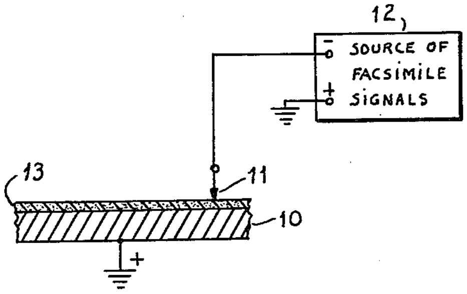
FIG. 1 is a magnified cross sectional view of a portion of a planographic plate according to the invention and showing schematically the method of electrochemically recording subject matter thereon.

Referring to FIG. 1, the numeral 10 represents a sheet or plate of metal, such for example as zinc or aluminum, etc., of any desired thickness, preferably although not necessarily of a thickness between 0.005 inch and 0.010 inch, such as used in the manufacture of a conventional metal offset plate. In accordance with the invention, the metal of the plate 10 is such that it is capable of acting as an electrolytic anode for cooperation with a corresponding recording cathode in the form of a stylus 11. For example, the cathode 11 may be connected to the negative terminal of any well known source of recording currents such as a source of facsimile electric signals 12 of any well known kind, the positive terminal of which may be grounded. Under that condition the plate 10 is also grounded, thus rendering it positive with respect to the cathode 11. Preferably, although not necessarily, the cathode 11 is in the form of a fine pointed stylus, and by any means well known in the facsimile recording art, relative movement can be effected between the stylus 11 and the plate 10 to scan the area of the plate in successive elemental areas so as to make, by electrochemical marking, a facsimile record thereon of the signals from the source 12. It will be understood, of course, that the invention is not limited to the use of a pointed stylus cathode. Accordingly, any other point-by-point scanning electrode arrangement may be used such as is well known in the art of electrochemical facsimile recorders.

In accordance with the invention, one side of the plate 10, namely the side facing cathode 11, is provided with a special electro-responsive electrolytic marking coat 13. For this purpose the said face of the plate 10, prior to being coated with the material 13, may be subjected to any well known surfacing operation so that it is relatively incapable of taking up printing ink from the inking device of any well known offset or lithographic printing machine. Such treatment is well known in the lithographic art and is in the form of a chemical or mechanical etching or graining of the metal surface, of which U.S. Patent No. 1,863,002 is typical. In accordance with the invention, the coat 13 is formed from a chemical salt solution such as is used in the manufacture of electrochemical facsimile recording blanks. Typical of such salts which produce the desired results are the chlorides, nitrates or sulphates of sodium or potassium. I have found that the best resutls are obtained when the chemical salt solution includes a sensitizing material in the form of a quinoline derivative, as described for example in my prior Patent No. 2,983,654, granted May 9, 1961. The chemical salt solution which is used in making the coat 13 is contained in a water soluble binder after which the water is evaporated therefrom until the moisture contained is approximately 20 percent to approximately 40 percent, or until a firm continuous film is obtained having a thickness of approximately 0.001 inch to approximately 0.003 inch.

One typical example of a satisfactory formulation for the coat 13 is as follows:

| | G. |
|---|---|
| Water | 100.0 |
| Methyl vinyl ether maleic anhydride copolymer | 10.0 |
| Potassium nitrate | 10.0 |
| Oxalic acid | .7 |
| Ethylene glycol | 2.5 |
| 8-hydroxyquinoline | 2.5 |

The water is divided into two portions, the binder of methyl vinyl ether maleic anhydride copolymer is dissolved in one portion, and the remaining ingredients are dissolved in the other portion. After solution, the two portions are mixed together. This material is then coated on the surface of plate 10 by any of the normal coating methods, such as spraying, dipping, brushing, knife coating, etc., so that when the coating has been dried to a moisture content of approximately 20 percent, a firm continuous film is produced having a thickness of approximately 0.001 inch to approximately 0.003 inch.

It will be understood that the invention is not limited to the particular combination of salts and the particular binder above mentioned. For example, other salt solutions can be used such as those disclosed in my copending application Serial No. 546,400, filed Nov. 14, 1955 as well as electrolytic salt solutions familiar to those skilled in the electrochemical facsimile recording art, the important criterion being that the metal of the plate 10, when acting as an anode, will react with an ingredient of the salt solution to produce a deposit on the plate 10 which will be ink receptive. These deposits are indicated schematically by the numeral 14 in FIG. 3.

Likewise other binders for the salt solution can be used such as gelatin, hydroxyethyl cellulose, methyl cellulose, polyvinyl alcohol, etc. The only requirement of the binder is that it will not coagulate when the salt solution is added to it and that it will form a satisfactory film when dry. Some of the binders have a very desirable function in that when a recording is taking place the metal of the anode 10 ionizes in the immediate vicinity of the cathode 11, and the resultant ions tend to insolubilize the binder. This is true for instance with gelatin, hydroxyethyl cellulose and methyl vinyl ether maleic anhydride copolymer binders.

Figure 3:
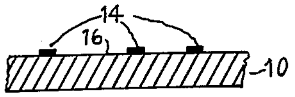
FIG. 3 is a view of the blank of either FIG. 1 or FIG. 2 after the surface coat has been removed subsequent to recording.

After recording, the coated surface is washed with water leaving the areas where current has been applied visible as colored, slightly raised areas 14 (FIG. 3). These areas, after drying, will be receptive to ink such as that from the inking device of a lithographic printing press.

Figure 2:
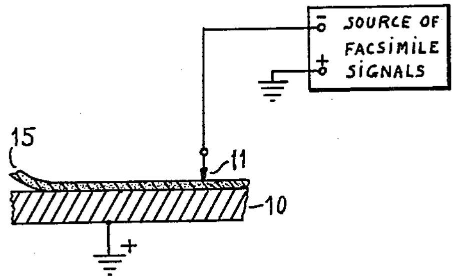
FIG. 2 shows a modification of the blank of FIG. 1 employing a specially prepared strippable electrolytic coat.

Instead of making the coat 13 in the form of a dried solution to form a film which is adherent to the plate 10, that coat may be formed as a separate sheet 15 (FIG. 2), such as a sheet of paper or fabric which has been treated or impregnated with the salt solutions above described or with the salt solutions as described in my copending application Serial No. 546,400. This sheet when separately prepared can then be pressed into intimate contact with the upper face of plate 10, the pressure being such as to intimately but strippably attach the sheet 15 to the plate 10. The plate 10 with the strippably attached sheet is then subjected to the facsimile recording operation in the same manner as above described in connection with FIG. 1, namely by using the plate 10 as the anode and by locating the sheet 15 in contact with the recording stylus cathode 11.

After the subject matter has been recorded on the blank, the sheet 15 is stripped therefrom and any surface moisture that remains on the surface of plate 10 can be removed, leaving a blank identical with that above described (see FIG. 3) containing the colored raised areas 14 which are ink receptive to the ink used in any offset or lithographic machine, while the remaining unrecorded areas 16 of the plate 10 are not ink receptive. In the case of the blank of FIG. 1, the layer 13, after the recording, can be removed by water washing. The blank 10 with the recorded ink receptive areas 14 thereon can then be used as a lithographic master in any well known offset or lithographic printing machine. Although not necessary, superior results can be obtained if the sheet 15, in addition to having the above-noted electrolytic salts incorporated therein, also contains one of the hereinabove mentioned binders.

While the invention is not limited to any particular metal for the plate 10 and the cathode 11, merely by way of example the plate 10 may be of zinc or aluminum and the cathode 11 may be of any metal. While electrical arrangement of the marking element and recording medium described hereinabove give the best results with the polarity mentioned, it is obvious that in some cases better marking may be obtained by a reversal of the polarity.

Various changes and modifications may be made in the disclosed embodiments without departing from the spirit and scope of the invention.

What is claimed is:

1. The method of making a planographic master printing plate, which comprises providing a metal backing with a covering layer containing an electrolytic facsimile marking salt, the surface of said backing being hydrophilic and non-receptive to lithographic printing inks, scanning said layer with a recording cathode, connecting said cathode to the negative terminal of a source of variable recording current, and connecting said backing to the positive terminal of said source to produce on the surface of said backing facing said cathode a deposit which is selectively responsive to take ink from the inking device of a lithographic printing machine, and then removing said layer without disturbing said deposit.

2. The method of making an electro-responsive planographic master printing plate, which comprises impregnating a porous sheet with an electrolytic facsimile marking salt, strippably attaching said sheet to one surface of a metal backing having a hydrophilic surface which is non-receptive to lithographic inks, and passing signal control currents through said sheet by connecting the backing as an anode to a source of facsimile signal voltages, and then stripping said sheet from said backing to leave on said backing deposits at the areas which have been acted upon by said signal currents which deposits are selectively responsive to take up ink from the inking device of a lithographic printing machine.

3. An electro-responsive recording blank especially designed for forming an electrically inscribable planographic printing master, comprising a metal backing having a hydrophilic surface which is non-receptive to lithographic inks, said backing having attached thereto an electrically conducting coat consisting primarily of an electrolytic facsimile marking salt and a water-soluble binder.

4. An electro-responsive recording blank especially designed for forming an electrically inscribable planographic printing master, comprising a metal backing having a hydrophilic surface which is non-receptive to lithographic inks, said backing having attached thereto a coat in the form of a strippable sheet containing an electrolytic facsimile marking salt.

5. The method of making an electrically inscribed planographic master, which comprises treating the surface of a metal sheet to render it hydrophilic and non-receptive to lithographic inks, providing said surface with a layer containing an electrolytic facsimile marking salt, subjecting said layer in successive elemental areas to a variable recording current to produce ink-receptive areas on the metal surface of said sheet while at least partially destroying said layer over said ink-receptive areas, and then removing the remainder of said layer.

6. An electro-responsive recording blank especially designed for forming an electrically inscribable planographic printing master, comprising a metal backing having a hydrophilic surface which is non-receptive to lithographic printing inks, and an electrically conducting layer on said metal backing consisting primarily of an electrolytic facsimile marking salt and a binder.

7. The method of making a planographic printing master which comprises the steps of providing a metal backing with a layer containing an electrolytic facsimile marking salt, the surface of said backing under said layer being hydrophilic and non-receptive to lithographic printing inks, scanning the surface of said layer with a recording point contact electrode maintained at a variable potential with respect to the metal backing to form a desired pattern of ink-receptive residue on said surface of said backing, and then removing the remainder of said layer from the backing.

8. The method of making a planographic printing master which comprises the steps of providing a metal backing with a layer containing an electrolytic facsimile marking salt, the surface of said backing being hydrophilic and non-receptive to lithographic printing inks, contacting the surface of said layer in selected areas with a recording electrode, connecting said electrode to one terminal of a source of recording current, and connecting said backing to the other terminal of said source to deposit a residue on the surface of said backing which faces said layer, and then removing the remainder of said layer from said backing.

9. The method of making a planographic printing master which comprises the steps of providing a metal backing with a layer containing an electrolytic facsimile marking salt, the surface of said backing being hydrophilic and non-receptive to lithographic printing inks, contacting the surface of said layer with an electrically energized recording point contact electrode, to deposit an ink-receptive residue on the surface of said backing which faces said layer, and then removing the remainder of said layer from said backing.

References Cited in the file of this patent

UNITED STATES PATENTS

| | | |
|---|---|---|
| 6,420 | Morse | May 1, 1849 |
| 1,221,780 | Wald | Apr. 3, 1917 |
| 1,656,338 | Ranger | Jan. 17, 1928 |
| 2,040,142 | Koreska et al. | May 12, 1936 |
| 2,173,141 | Talmey | Sept. 19, 1939 |
| 2,251,742 | Kline | Aug. 5, 1941 |
| 2,294,147 | Wise et al. | Aug. 25, 1942 |
| 2,319,765 | Talmey | May 18, 1943 |
| 2,713,822 | Newman | July 26, 1955 |

FOREIGN PATENTS

| | | |
|---|---|---|
| 4 | Great Britain | of 1879 |
| 550,575 | Germany | May 12, 1932 |